(12) United States Patent
Hagan et al.

(10) Patent No.: US 12,265,007 B2
(45) Date of Patent: Apr. 1, 2025

(54) AIR MEASUREMENT DEVICE

(71) Applicant: QuantAQ, Inc., Somerville, MA (US)

(72) Inventors: David Hagan, Cambridge, MA (US); Eben Cross, Melrose, MA (US)

(73) Assignee: QuantAQ, Inc.

( * ) Notice: Subject to any disclaimer, the term of this patent is extended or adjusted under 35 U.S.C. 154(b) by 314 days.

(21) Appl. No.: 17/495,766

(22) Filed: Oct. 6, 2021

(65) Prior Publication Data
US 2022/0107259 A1 Apr. 7, 2022

Related U.S. Application Data

(60) Provisional application No. 63/088,000, filed on Oct. 6, 2020.

(51) Int. Cl.
*G01N 15/0205* (2024.01)
*G01N 15/10* (2024.01)

(52) U.S. Cl.
CPC . *G01N 15/0211* (2013.01); *G01N 2015/1024* (2024.01)

(58) Field of Classification Search
CPC .............. G01N 15/0211; G01N 2015/1062
See application file for complete search history.

(56) References Cited

U.S. PATENT DOCUMENTS

| 7,932,490 B2 * | 4/2011 | Wang ................ G01N 15/0205 73/30.01 |
| 8,534,116 B2 | 9/2013 | Wang et al. |
| 2002/0186377 A1 | 12/2002 | Kuskovsky et al. |
| 2012/0222495 A1 | 9/2012 | Bates |
| 2016/0063841 A1 | 3/2016 | Schultz et al. |
| 2016/0334275 A1 | 11/2016 | Sanzari |

(Continued)

OTHER PUBLICATIONS

Christine S. Sloane, Mark J. Rood & C. Fred Rogers (1991) Measurements of Aerosol Particle Size: Improved Precision by Simultaneous Use of Optical Particle Counter and Nephelometer, Aerosol Science and Technology, 14:3, 289-301, DOI: 10.1080/02786829108959491 (Year: 1991).*

(Continued)

*Primary Examiner* — Rebecca C Bryant
(74) *Attorney, Agent, or Firm* — Nutter McClennen & Fish LLP

(57) ABSTRACT

An inexpensive, yet accurate particle matter (e.g., PM) detector is described that combines the features of two different optical particle sensors with a modeling tool to provide a comprehensive, effective air quality measurement instrument (e.g., sensing instrument). The modeling tool enables the use of a combination low cost optical particle sensors, such as a nephelometer and an optical particle counter to determine the amounts of unhealthy particles that are present in air. The sensing instrument determines the total mass loading at specific size breakpoints, such as $PM_1$, $PM_{2.5}$, and $PM_{10}$. In some embodiments, the sensing instrument may include gas sensors so that the particular gaseous pollutants can be identified and measured. In some embodiments, the sensing instrument may further include one or more of a humidity sensor, a temperature sensor, and a pressure sensor.

25 Claims, 13 Drawing Sheets

(56) References Cited

U.S. PATENT DOCUMENTS

2018/0231448 A1* 8/2018 Moenkemoeller ..... G01N 21/53

OTHER PUBLICATIONS

Kassianov, E.; Berg, L.K.; Pekour, M.; Barnard, J.; Chand, D.; Comstock, J.; Flynn, C.; Sedlacek, A.; Shilling, J.; Telg, H.; et al. A Closure Study of Total Scattering Using Airborne In Situ Measurements from the Winter Phase of TCAP. Atmosphere 2018, 9, 228. https://doi.org/10.3390/atmos9060228 (Year: 2018).*

International Search Report and Written Opinion for International Application No. PCT/US2021/053852 mailed Dec. 28, 2021. 18 pages.

Extended European Search Report for patent application No. EP21878496.5 dated Oct. 16, 2024 (11 pages).

Guyon Pascal et al.: "Refractive index of aerosol particles over the Amazon tropical forest during LBA-EUSTACH 1999—ScienceDirect", Journal of Aerosol Science, [Online] vol. 34, No. 7, Jul. 1, 2003 (Jul. 1, 2003), pp. 883-907, XP093209923, Amsterdam, NL ISSN: 0021-8502, DOI: 10.1016/S0021-8502(03)00052-1 Retrieved from the Internet: URL:https://www.sciencedirect.com/science/ article/pii/S0021850203000521> [retrieved on Sep. 30, 2024] * Points 1, 2 and 4 *.

Zhao Fengsheng et al.: "Simultaneous determination of the aerosol complex index of refraction and size distribution from scattering measurements of polarized light", Oct. 20, 1997 (Oct. 20, 1997), pp. 1-14, XP093209943, DOI: 10.1364/AO.36.007992(10.1364/AO.36. 007992 Retrieved from the Internet: URL:https://opg.optica.org/ao/fulltext.cfm ?uri=ao-36-30-7992 &id=42801 [retrieved on Sep. 30, 2024] * Points 1 and 5 *.

* cited by examiner

AIR MEASUREMENT DEVICE

PRIORITY

This patent application claims priority from provisional U.S. patent application No. 63/088,000, filed Oct. 6, 2020, entitled, "AIR MEASUREMENT DEVICE," and naming David Hagan and Eben Cross as inventors, the disclosure of which is incorporated herein, in its entirety, by reference.

FIELD

Illustrative embodiments of the invention generally relate to air quality determination and, more particularly, various embodiments relate to monitoring particulate size and concentration in air.

BACKGROUND

Human exposure to small particles, such as aerosols, is associated with adverse health impacts and increased mortality, with millions of annual deaths worldwide attributed to ambient particulate matter pollution. Particulate matter (PM) is a component of air pollution, and is also called particle pollution. PM is a mixture of solid particles and liquid droplets found in the air. Some particles, such as dust, dirt, soot, or smoke, are large or dark enough to be seen with the naked eye. These particles come in many sizes and shapes and can be made up of hundreds to thousands of different chemical compounds. Some are emitted directly from a source, such as construction sites, unpaved roads, fields, smokestacks or wildfires. A significant portion of particles form in the atmosphere as a result of complex reactions of gas-phase precursor chemicals, which are pollutants emitted from power plants, industries, automobiles, and plant-life.

PM contains microscopic solids or liquid droplets that are so small that they can be inhaled and cause serious health problems. Some particles less than 10 micrometers (e.g., μm) in diameter, (e.g., $PM_{10}$) can deposit deep into the lungs and some may even enter the bloodstream. PM less than 2.5 μm in diameter (e.g., $PM_{2.5}$) pose the greatest risk to human health.

Access to real-time, accurate information about aerosol sources, and in particular $PM_{10}$ and $PM_{2.5}$ concentrations would help mitigate this problem across indoor and outdoor environments. PM pollution is regulated by national and local government agencies (e.g., the US Environmental Protection Agency) and is typically measured using federally approved reference methods (Federal Reference Method ("FRM") or Federal Equivalent Method ("FEM")) that are accurate and precise.

Existing methods are in place to measure regional-scale air pollution in an effort to enforce and assess the effectiveness of air quality regulations. While these instruments meet the need for monitoring regional-scale air pollution, PM pollution varies in space and time at much finer resolution than can be measured using regional monitoring techniques, especially when considering their large physical size, operational complexity, and capital cost.

In recent years, new technologies have emerged at significantly lower price points (<$2,000) than was previously available. Some of these technologies are physically small, use minimal power, and can easily be deployed and managed at scale. These sensors are ideally suited for use in large distributed sensor networks to provide high-resolution, locally-relevant air quality measurements. However, this new class of instruments relies on a different operating principal than most FRM and FEM-approved instruments, which can lead to significant challenges for obtaining accurate and reliable measurements of PM. Furthermore, accurate measurement of PM sizes and concentrations is made more difficult by the rapidly varying levels of dust, dirt, soot, and smoke in the air.

SUMMARY OF VARIOUS EMBODIMENTS

In accordance with one embodiment of the invention, a device for measuring particles in air includes: a first sensor configured to measure the particles in the air as an ensemble using a light beam directed toward the ensemble of particles, the first sensor determining a total integrated scattered light signal given by the ensemble of particles in the air, the total integrated scattered light signal detected by a first optical detector positioned at a scattering angle, the scattering angle being between about 5 degrees and about 175 degrees; a second sensor configured to produce a light path through which individual particles in the air pass, the second sensor configured to determine a number and a size of the individual particles by correlating an intensity of light scattered by the individual particles to the size of the individual particles, the particle size of the individual particle being proportional to the intensity of the scattered light detected by a second optical detector; a modeling tool operatively coupled with the first and second sensors, the modeling tool configured to determine a total mass loading of particles in the air at specific size breakdowns, wherein the determination is based on the total integrated scattered light signal and the number and size of individual particles; and a memory device operatively coupled with the modeling tool, the total mass loading of particles in the air at specific size breakdowns is stored in the memory device.

The device may further include a common inlet fluidly coupled with the first sensor and the second sensor. The first and second sensors may be configured to substantially simultaneously measure particles in the air. The first sensor may be a nephelometer, and the second sensor may be an optical particle counter. The first sensor may be configured to collect the total integrated scattered light signal for an interval of between 0.01 seconds and 60 seconds, for an interval of between 0.1 seconds and 30 seconds, or for an interval of between 1 second and 10 seconds. In embodiments, first sensor may be configured to collect the total integrated scattered light signal for an interval of 5 seconds. The second sensor may be configured to collect the intensity of light scattered by the individual particles at a sampling rate between 500 kHz and 50 MHz, and for duration of between 0.1 seconds and 120 seconds. The sampling rate may be 1 MHz, and duration may be 5 seconds.

The device may further include one or more of a humidity sensor, a temperature sensor, and a pressure sensor. The device may further include one or more gas sensors. The one or more gas sensors may detect and/or measure at least one of $O_3$, NO, $H_2S$, $SO_2$, $NO_2$, $CO_2$, or CO.

In accordance with another embodiment of the invention, method of measuring particles in air includes: sampling an air with a common inlet fluidly coupled to a first sensor and a second sensor, a first air sample fluidly passing to the first sensor, and a second air sample fluidly passing to the second sensor; measuring first particles in the first air sample with the first sensor as an ensemble of particles, the first sensor configured to use a light beam directed toward the ensemble of particles, the first sensor determining a total integrated scattered light signal given by the ensemble of particles in the first air sample, the total integrated scattered light signal measured at a scattering angle for a first duration; measuring second particles in the second air sample as individual particles in the second air sample with the second sensor for a second duration, the second sensor configured to: produce a light path through which the individual particles in the second air sample pass; and measure a scattered light signal from individual particles passing through the light path to determine a number of particles per cubic centimeter between a first particle diameter and a second particle diameter for a range of particle diameters; determining a total mass loading at specific size breakdowns of particles in the air utilizing a modeling tool coupled to a processor, wherein the modeling tool is configured to receive: a first data set configured to contain a single scalar value representing the total scattered light signal given by the ensemble of particles in the first air; and a second data set configured to contain an array comprising the number of particles per cubic centimeter between a first particle diameter and a second particle diameter for a range of particle diameters; and storing, in a memory, the total mass loading at specific size breakdowns of particles in the air. The second sensor may be an optical particle counter.

The scattered light signal by each individual particle may be measured as a light pulse. The signal from each light pulse may be assigned to a size bin based on an intensity of the signal. The second sensor may sort each size bin into a histogram. The sampling rate of the second sensor may be between 500 kHz and 10 MHz. The first duration may be between 1 second and 1 minute. The second duration may be between 1 second and 1 minute. The modeling tool may determine the total mass loading at specific size breakdowns of the particles in the air after the first duration and second duration are complete.

The method may further include measuring one or more of a humidity, a temperature, or a pressure of the sample air with one or one of a humidity sensor, a temperature sensor, or a pressure sensor.

The method may further include measuring at least one of $O_3$, NO, $H_2S$, $SO_2$, $NO_2$, $CO_2$, or CO with one or more gas sensors.

In accordance with another embodiment of the invention, a system for measuring particles in air includes: a processor; a memory coupled to the processor; a first sensor configured to measure the particles in a first air as an ensemble using a light beam directed toward the ensemble of particles, the light beam scattering off of the ensemble of particles in the first air, the first sensor determining a total integrated scattered light signal; a second sensor configured to measure individual particles in a second air, the second sensor configured to determine a number and a size of the individual particles in the second air by correlating an intensity of the light scattered by the individual particles to the size of the individual particles in the second air; a common inlet fluidly coupled with the first sensor and the second sensor; and a modeling tool operably coupled with the processor; wherein the modeling tool is configured to: receive: a first data set configured to contain a single scalar value representing the total scattered light signal given by the ensemble of particles in the first air; and a second data set configured to contain an array comprising a number of particles per cubic centimeter between a first particle diameter and a second particle diameter for a range of particle diameters; determine a total mass loading at specific size breakdowns of particles in the air; and store the determined total mass loading at specific size breakdowns of particles in the air. The first air and the second air may be an air sample collected by the common inlet at substantially a same time from substantially a same location.

The first sensor may be a nephelometer. The nephelometer may be configured to measure the total scattered light signal by the ensemble of particles in the first air across a scattering angle. The scattering angle may be an angle between about 5 degrees and about 175 degrees.

The system may further include one or more gas sensors fluidly coupled with the common inlet. The one or more gas sensors may measure at least one of $O_3$, NO, $H_2S$, $SO_2$, $NO_2$, $CO_2$, or CO. The system may further include one or more of a humidity sensor, a temperature sensor, and a pressure sensor. The modeling tool may be further configured to identify at least one of types or sources of aerosols.

Illustrative embodiments of the invention are implemented as a computer program product having a computer usable medium with computer readable program code thereon. The computer readable code may be read and utilized by a computer system in accordance with conventional processes.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DESCRIPTION OF ILLUSTRATIVE EMBODIMENTS

Figure 1:
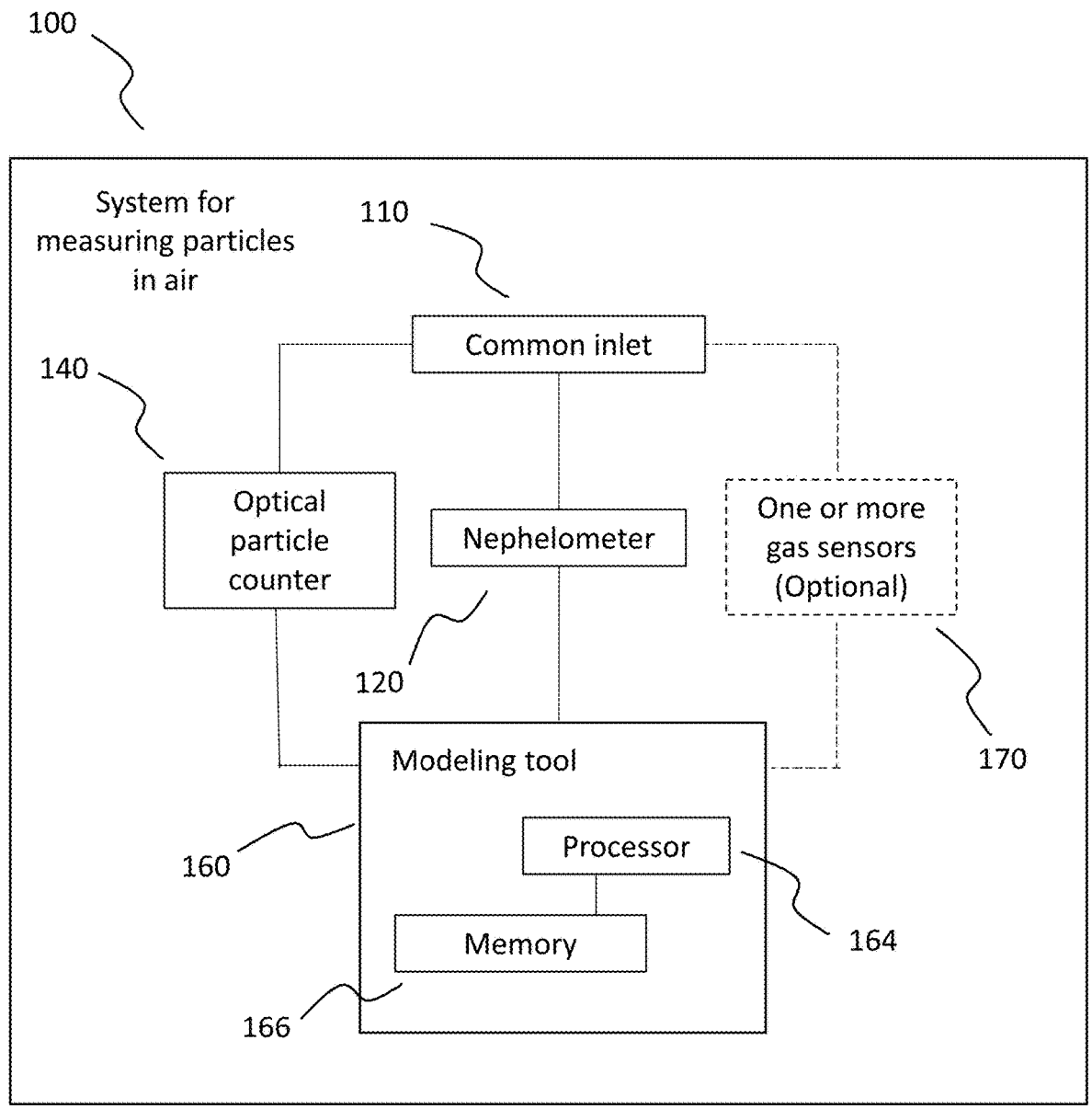
FIG. 1 illustrates a non-limiting embodiment of a system for measuring particles.

In illustrative embodiments, an inexpensive, yet accurate particle matter (e.g., PM) detector is disclosed that combines the features of two different optical particle sensors (OPSs) with a modeling tool to provide a comprehensive, effective air quality measurement instrument (e.g., sensing instrument). The modeling tool enables the use of a combination of particle sensors to determine the amounts of unhealthy particles that are present in air. The sensing instrument determines the total mass loading at specific size breakpoints, such as $PM_1$, $PM_{2.5}$, and $PM_{10}$. In some embodiments, the sensing instrument may include gas sensors so that the particular gaseous pollutants can be identified and measured. In some embodiments, the sensing instrument may further include one or more of a humidity sensor, a temperature sensor, and a pressure sensor.

Details of illustrative embodiments are discussed below.

Sensing Instrument

In some embodiments, the sensing instrument combines a first sensor that provides information about the total integrated particle size distribution (e.g. an ensemble of particles), with a second sensor that provides size-resolved information about the particle size distribution of individual particles. As a result, the sensing instrument may be configured to measure the same air mass and provide estimates for particulate matter mass loadings across a broad spectrum of particle sizes.

In some embodiments, the air particle sensing instrument (e.g., sensing instrument, or sensing device) combines the features of a nephelometer and an optical particle counter (OPC). The sensing device effectively combines a nephelometer and an OPC to simultaneously measure air from a common inlet, and then uses a modeling tool to determine an estimate for the total mass loading at specific size breakpoints (e.g., $PM_1$, $PM_{2.5}$, $PM_{10}$).

In some embodiments, the sensing instrument comprises a system that includes a common air inlet (e.g., common inlet). The common air inlet may receive ambient air that surrounds the sensing instrument. For example, when the sensing instrument is positioned in a certain location, the common air inlet allows for the flow of air to reach the optical particle sensors (e.g., OPSs) at substantially the same time. That is, the common air inlet allows for simultaneous, or substantially simultaneous readings. By measuring the particles in the ambient air at nearly the same time, it is possible to draw correlations between the optical scattering measurements of the two OPSs.

Nephelometer

The sensing instrument includes a nephelometer in fluid communication with the common inlet. Nephelometers measures the light scattered by an aerosol population across a wide range of angles to gather as much of the scattered light as possible, while avoiding the near-forward and near-backward scattered light. The measured light is primarily scattered by the collection of PM that comprises the aerosol, and it is measured by an optical detector (e.g., light detector). In some embodiments the optical detector comprises one or more of photomultiplier tube, or a photometer.

A nephelometer may be defined by the wavelength of its light source (λ), the scattering angle at which the optical detector is located relative to the position of the light source (e.g., the viewing angle), and the type of optical detector. The optical detector measures a signal from the scattered light for a duration of time. In embodiments, that duration may be between 1 millisecond (ms) and 1 minute, or it may be between 100 ms and 30 seconds (s), or it may be between 1 s and 10 s. In embodiments, the duration of the light measurement for the nephelometer may be 5 s.

The measurement of the scattered light signal is a scaler value. That is, each measurement has a single value associated with the intensity of light that is measured by the optical detector at the scattering angle. Once the measurement is complete, the measurement may be stored in a memory (e.g., memory device, or storage device). The stored scalar data value may be used by the modeling tool (to be discussed later).

Since the nephelometer is fluidly connected to the common inlet, it may take measurements nearly continuously. That is, following the measurement and storage of a light scattering measurement, the nephelometer may perform another measurement, and then store that value.

Continuous measurements permit the nephelometer to make a record of how the PM mass and concentration changes over a given time period. In essence, by continuously running the nephelometer, that is, taking and storing measurements repeatedly, a time series of data may be collected. Such a time series may be useful in describing how PM increases and decreases at certain times of day and night.

Optical Particle Counter

The sensing instrument also includes an OPC in fluid communication with the common inlet. An OPC illuminates individual particles and measures light scattered from the individual particle. The amount of scattering is at least proportional to the size of the particle. A light beam is directed from a light source toward the stream of particles. The light source may comprise at least one of a light emitting diode (e.g., LED) or a laser, and it shines through the stream of particles to a back stop. When the light beam interacts with a particle, light is scatted in many directions. A reflecting mirror is positioned near the location where the light beam interacts with the particle, and the mirror gathers a portion of the scattered light and reflects that light onto an optical detector (e.g., light detector). In some embodiments the optical detector comprises one or more of photomultiplier tube, or a photometer.

An OPC is defined by three instrument-specific parameters: (1) the wavelength of the light source (λ); (2) the viewing angle for which the scattered light is collected; and (3) the number of discrete size bins and their widths. The optical detector measures an intensity of light of the light burst for each particle detected, and it performs that measurement from the scattered light for a duration of time. In embodiments, an OPC typically has a set sampling rate that is between about 500 kHz and 50 MHz, and for many instruments the sampling rate is between about 800 kHz and 10 MHz, and in some cases the sampling rate is about 1 MHz. The sampling rate defines a sampling window during which the scattered light is collected.

The OPC automatically records all of the detected light signals during each sampling window, and then sorts the detected signals into bins. A bin, in this context, refers to a single "slice" of the aerosol size distribution, with a fixed width and units of particle diameter. Typically, most low-cost OPCs have between 2 and 30 bins. These can be determined either by looking up the parameters in the device's data sheet provided by the manufacturer or by making simple measurements. Bins are often chosen to reduce the uncertainty in correct bin assignments within the bounds of what the sensor is capable of detecting. Most low cost OPCs have the smallest bin at $D_{min}$~500 nm, with cost typically being the driving factor, because OPCs with lower $D_{min}$ values employ more expensive, higher-quality optics and photodetectors, allowing them to accurately detect smaller particles. The bin boundaries (and hence widths) used for a given OPC are taken from the manufacturer's spec sheets if available; otherwise, they are calculated by generating an array of logarithmically spaced bin boundaries for a set number of bins ($n_{bins}$) between the minimum and maximum defined diameters ($D_{min}$ and $D_{max}$, respectively). Most often, a light pulse generated by a single particle is assigned to exactly one bin.

Once the signal is measured, the value is stored in a memory. The OPC continues to take new light scattering measurements of the particles that flow through the instrument for a duration of time, which is typically between 1 s and 10 s. In this manner, the OPC counts and sizes each individual particle that flows through the light path and stores it in a bin, resulting in a histogram of particle number and size that is obtained by correlating the intensity of the scattered light to the size of a particle in the bins. After some sampling period (on the order of seconds), the histogram can be integrated to calculate the total mass for a given range of particle diameters. The histogram of particle number and size is stored as an array.

Since the OPC is fluidly connected to the common inlet, it may take measurements nearly continuously. That is, following the measurement and storage of an array of values, the OPC may perform another measurement, and then store that array.

Continuous measurements permit the OPC to make a record of how the PM mass and concentration changes over a given time period. In essence, by continuously running the OPC, that is, taking and storing measurements repeatedly, a time series of data may be collected. Such a time series may be useful in describing how PM increases and decreases at certain times of day and night.

Modeling Tool

The sensing instrument also includes a modeling tool. The modeling tool integrates the particle size information provided by the two different OPSs. An OPC measures individual particles with a particle size between about 300 nm (0.3 µm) and 100,000 nm (100 µm). Instruments that provide the size-resolved information about aerosols (such as OPCs) offer several advantages over instruments that measure the total integrated signal (such as by a nephelometer). However, OPCs cannot effectively measure particles smaller than about 300 nm in diameter. For a particle size range less than 300 nm, a nephelometer provides information about the total light scattered by the sub-300 nm aerosol ensemble.

The modeling tool includes a computer model (e.g., a modeling algorithm) that describes how a given sensor will respond to different aerosols under a wide range of conditions. This algorithm in the modeling tool is based on the underlying physics of light scattering (Mie theory) in addition to relationships obtained through laboratory or field measurements. This modeling algorithm involves a detailed treatment of light scattering as it relates specifically to low cost sensors, in that the model isolates the relevant sources of error, and develops a better understanding of the limitations (as well as strengths) of different kinds of OPSs.

The modeling algorithm uses a model that incorporates the array of values determined by the OPC and the scalar values measured by the nephelometer. For every measurement, two spectra are produced: (a) the first contains an array of values consisting of the number of particles per cubic centimeter between two particle diameters for a range of diameters; (2) the second contains a single scalar value representing the total scattered light signal. For example, the array of values as produced by an OPC, consisting of the number of particles per cubic centimeter may be of form:

$$X=[100, 80, 60, 50, 30, 10, 0, 0, 0]$$

where the first value is the number of particles per cubic centimeter between 0.3 µm and 0.5 µm, the second value is the number of particles between 0.5 µm and 1.0 µm, and so forth. A scalar value (not shown above) from a nephelometer represents the total scattered light for the entire size distribution.

In embodiments, the final number computed by the modeling tool is an integrated mass values between two diameters. For example, the most regulated pollutant is $PM_{2.5}$ which is the total integrated mass of PM per cubic meter of air (e.g., µg/m$^3$) between 0 µm and 2.5 µm particle diameters. To compute this value, a stepwise integration of the OPC data is performed using the array of values which permits the estimation of the mass loading between predetermined size limits. Often, a significant amount of the PM is less than about 0.3 µm. To improve the measurement of particles in this size range, the nephelometer can be used which represents the total scattered light to infer what is 'missing mass' (i.e., below 0.3 µm). In addition, the total scattered light signal from each sensor can be used to reduce the uncertainty in the optical measurements as they are scattering light at different angles and produce different spectral signals. In embodiments, the modeling tool may be used to calibrate and optimize performance of any given OPS. For example, the modeling tool may be used to calibrate the OPS to correct for taking measurements under a range of environmental conditions. Furthermore, the modeling tool may be included in a measurement tool to characterize how different OPSs may detect various aerosol types under a range of environmental conditions. This enables new insights into the potential errors associated with a given PM measurement, optimal strategies for calibrating OPSs, and ultimately the design of the sensors themselves. The modeling may also be used in the development and improvement of algorithms for data analysis.

In embodiments, the modeling tool may incorporate modeling software developed to investigate broad influences of aerosol properties and sensor parameters on measurement performance.

In embodiments, the modeling tool may incorporate artificial intelligence to refine and improve the modeling software. Machine Learning and/or Artificial Intelligence (e.g., ML/AI) approaches may be applied to the modeling algorithm to (1) reduce uncertainty in the aerosol optical and physical properties, and (2) identify types and sources of aerosols/particle pollution using both supervised and unsupervised learning methods including, but not limited to, artificial recurrent neural networks such as Long Short-Term Memory networks.

In embodiments, the modeling tool may incorporate algorithms developed for analyzing data collected simultaneously from more than two OPSs. In some embodiments, the sensing instrument may include more than one OPC, more than one nephelometer, or more than one of each. The multiple OPSs may utilize different scattering angles. The multiple OPS's may utilize different light sources. The multiple OPS's may utilize different wavelengths of light in the light source. The multiple OPS's may utilize different optical detectors. The use of more than two OPSs in a sensing instrument may improve the sensitivity and/or accuracy of the sensing instrument.

In some embodiments, the algorithms in the modeling tool determine at least one of a particle size and/or a concentration of particles in the air, in an air sample, wherein the determination is based on the total integrated scattered light signal and the number and size of individual particles.

The combination of a nephelometer, an OPC, and a modeling tool into a sensing instrument mitigates some of the errors inherent in the use of low cost OPSs in an environment that may include varying levels of dust, dirt, soot, and smoke in the air. It is surprising that a combination of different OPSs, that utilize different optics and approaches, and that measure slightly different particle size ranges, can be combined with a modeling tool utilizing a modeling algorithm coupled to a processor to determine a total mass loading at specific size breakdowns of particles in the air.

A discussion of error removal will be provided in greater detail below.

Low Cost Particle Measuring Sensors

The disclosed sensing instrument solves many problems associated with using individual low cost optical particle sensors to determine important integrated mass values of interest. Many low-cost PM sensors measure aerosols via light scattering, where the sampled aerosols intercept a beam of light (typically from a laser or LED with a wavelength between 405 and 780 nm), and the scattered light is then measured and correlated to a reference PM concentration. The low-cost PM sensors tend to be poorly characterized, and their measurements of mass concentration can be subject to considerable error. Recent studies have investigated how individual factors can contribute to this error, but these studies are largely based on empirical comparisons and generally do not examine the role of multiple factors simultaneously.

In some embodiments, the disclosed sensing instrument includes at least two types of low-cost OPSs that may be combined to accurately characterize the size distribution and/or the mass loading of aerosol particles. Each of these two types of low-cost OPSs uses slightly different optics and approaches for measuring aerosols, but they require correction due to fundamental limitations in making PM mass measurements.

Errors in Low Cost PM Sensors

The use of light scattering introduces a number of fundamental limitations for making PM mass measurements. Many of these arise from environmental conditions and/or the properties of the aerosol being measured; these can be especially problematic when calibration is done using only a single aerosol type or condition. These issues include (1) the inability to adapt to changes in the particle size distribution, (2) the hygroscopic growth of particles due to changes in ambient relative humidity, (3) changes in scattering efficiency due to differences in aerosol optical properties, and (4) the need for aerosol-specific correction factors to account for differences in density.

Correcting for these individual properties is complicated, because all of these issues are intertwined. For example, when relative humidity increases, it can cause particles to take up water, which can change not only their size and mass but also their shape, refractive index, and density.

Representing an Aerosol Distribution

An aerosol distribution is represented as the sum of n lognormal modes, whereby each mode i is defined by its geometric mean particle diameter ($D_{p,i}$), geometric standard deviation ($\rho_i$), and number concentration (Ni). The aerosol distribution as a function of diameter $D_p$ ($dN/d\log D_p$) is given by Eq. (1):

$$\frac{dN}{d\log D_p} = \sum_{i=1}^{n} \frac{N_i}{\sqrt{2\pi} \log \sigma_i} \exp\left(-\frac{(\log D_p - \log \overline{D}_{p,i})^2}{2\log^2 \sigma_i}\right). \quad (1)$$

Additionally, the composition of the aerosol distribution is defined by defining the particle density ($\rho_i$), hygroscopic growth factor ($\kappa_i$), and complex refractive index ($m_i$) for each mode. While more complex representations of the chemical makeup of the aerosol can be implemented using the modeling framework (i.e., core-shell representation of aerosols, complex aerosol mixtures), this model assumes well-mixed homogeneous particle modes, as described by Eq. (1). The above number distribution can be converted to a mass distribution (or total mass concentration) by assuming all particles are spherical with a known density.

FIG. 1 illustrates a non-limiting embodiment of a system 100 for measuring particles. The system 100 may comprise a sensing instrument of the current disclose. The system 100 includes a common inlet 110. The common inlet 110, (e.g., inlet) is a structure that allows for the flow of a gas from a source of the gas into optical particle sensors fluidly attached to the common inlet 110. The gas may be from an ambient environmental air, such as encountered in an outdoor setting. In embodiments, the gas may be provided in an experimental setting by providing gases of know origin, gas composition, and/or known particle content. The gas may be standard gas for calibration purposes.

The system 100 further includes a nephelometer 120. The nephelometer is fluidically connected to the common inlet 110. The nephelometer measures the total light scattering of the of the aerosol as an ensemble. That is, the nephelometer measures the aerosols as an ensemble, gathering the total integrated scattered light signal by particles across a wide range of angles (typically 5 degrees to 175 degrees, such as 7 degrees to 173 degrees) while intentionally avoiding detection of light scattered in the forward or backward directions. The total scattering amplitude is converted to an estimated aerosol mass by correlating the nephelometer output to a reference measurement of the aerosol mass. A subset of nephelometers, the photometer, operates in a similar manner, but only gathers light from a small range of angles. Nephelometers and photometers can be repeatable and accurate so long as the composition and size of the underlying aerosol size distribution remains constant, with only the magnitude (the number of particles) changing. However, when these variables (e.g., size and/or composition) do change, the ratio of total scattered light to particle mass can change drastically, which undesirably causes large errors in the estimate of PM.

The system 100 further includes an OPC 140 in fluid communication with the common inlet 110. The OPC 140 measures the particle size of individual particles by measuring light scattering off of particles as they pass through the sensor. The amount of the light scattered by each particle measured is proportional to the size of the particle.

The system 100 further includes a modeling tool 160. The modeling tool includes a processor 164 and a memory 166. The modeling tool 160 includes an algorithm (e.g., modeling algorithm) that processes the data stored in the memory by the nephelometer and the OPC.

In some embodiments, the system may optionally further include one or more gas sensors 170. The one or more gas sensors 170 may be fluidly coupled with the common inlet, and may detect gases present in the air samples. For example, the one or more gas sensors may detect and measure at least one or more of $O_3$, NO, $H_2S$, $SO_2$, $NO_2$, $CO_2$, or CO. Furthermore, the modeling tool may be configured to identify types and/or sources of aerosols based on the measurements of the one or mare gas sensors, and/or the data stored by the nephelometer and/or the OPC.

Figure 2A:
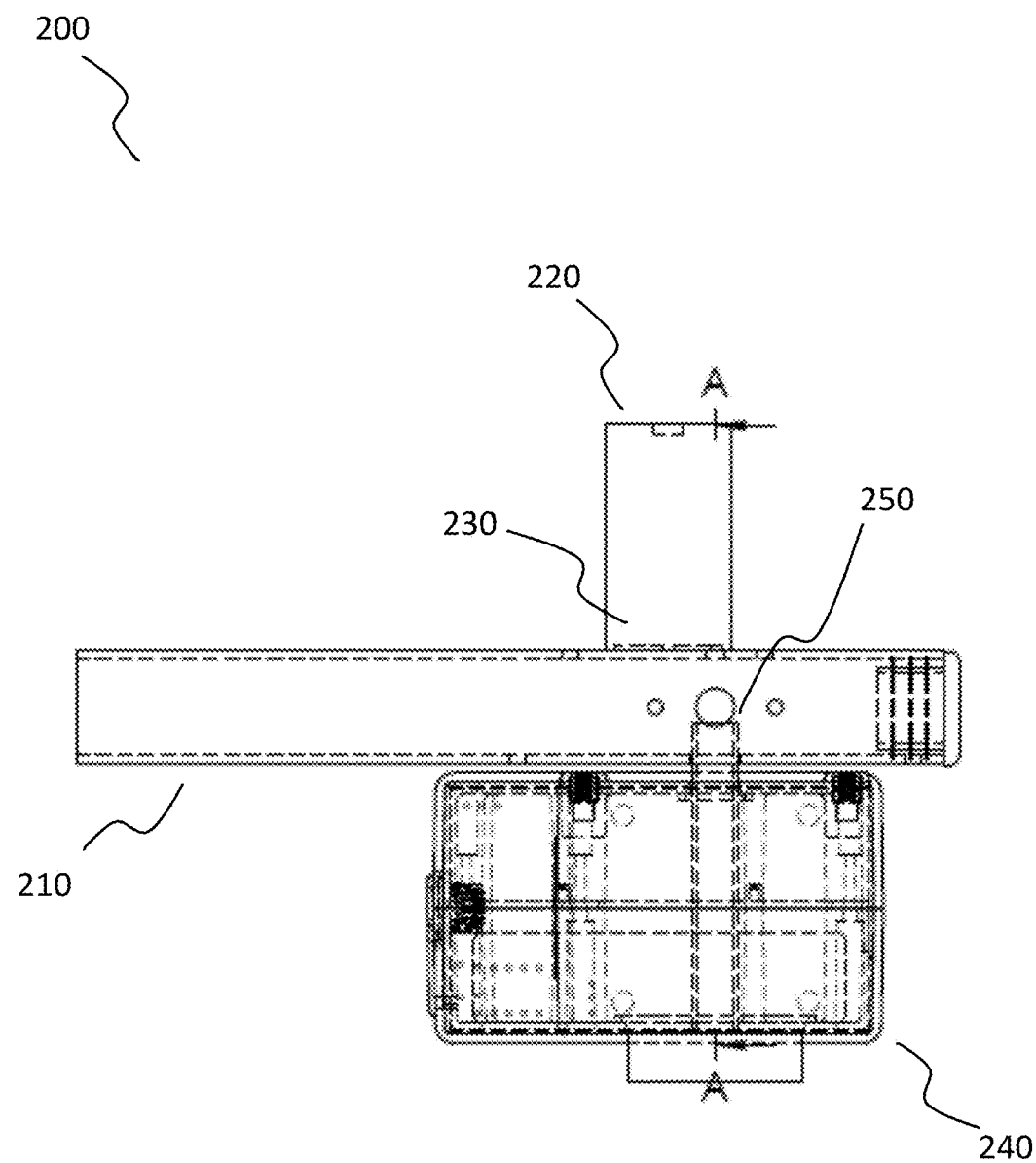
FIG. 2A illustrates a plan view of a non-limiting embodiment of sensing instrument.

FIG. 2A illustrates a plan view of a non-limiting embodiment of sensing instrument 200. Sensing instrument 200 includes a flow cell 210 that provides a sample gas to the sensing instrument 200. The flow cell 210 may also be referred to a common inlet 210. In embodiments, the sample gas may be ambient air surrounding the instrument as, for example, would be the case when the sensing instrument 200 is deployed in a test area. Test areas may include city streets, parks, buildings, construction areas, and so on.

The sensing instrument 200 further includes a nephelometer 220 in fluid communication with the flow cell/common inlet 210 at opening 230. Sample gas flows through the common inlet 210 into the nephelometer 220 through opening 230, whereupon the total scattered light signal given by the ensemble of particles in the sample air is measured.

The sensing instrument 200 further includes an OPC 240 in fluid communication with the flow cell/common inlet 210 at opening 250. Sample gas flows through the common inlet 210 into the OPC 240 through opening 250, whereupon a number and a size of individual particles in the sample air is determined by correlating the intensity of a scattered light to a size of the individual particles in the sample air.

Figure 2B:
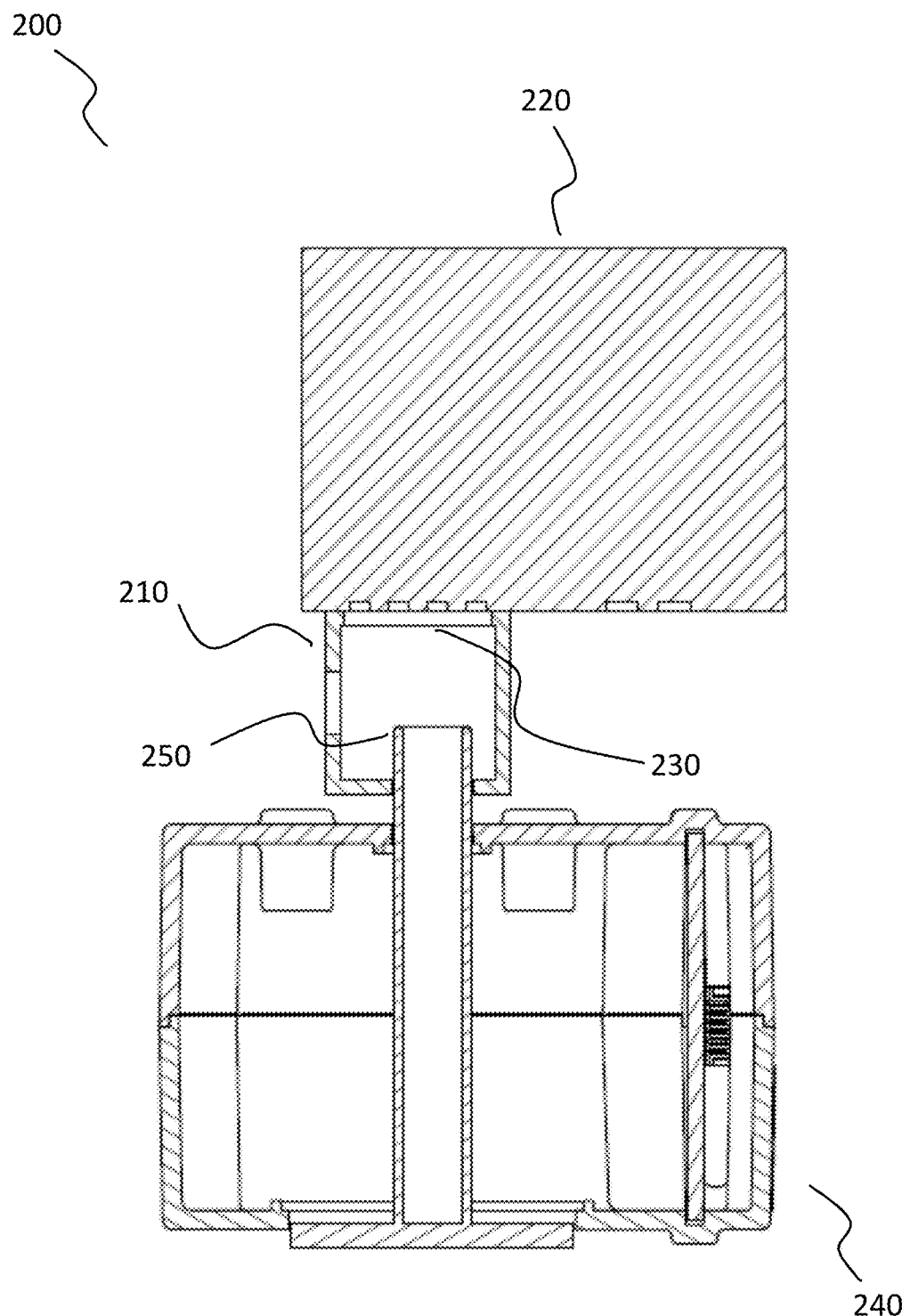
FIG. 2B illustrates a section view of the non-limiting embodiment of the sensing instrument in FIG. 2A.

FIG. 2B illustrates a section view of the non-limiting embodiment of sensing instrument 200 in FIG. 2A along section A-A. Sensing instrument 200 includes the flow cell 210 that provides the sample gas to the sensing instrument 200. The flow cell 210 may also be referred to a common inlet 210. In embodiments, the sample gas may be ambient air surrounding the instrument as, for example, would be the case when the sensing instrument 200 is deployed in a test area. Test areas may include city streets, parks, buildings, construction areas, and so on.

The sensing instrument 200 further includes the nephelometer 220 in fluid communication with the flow cell/common inlet 210 at opening 230. Sample gas flows through the common inlet 210 into the nephelometer 220 through opening 230, whereupon the total scattered light signal given by the ensemble of particles in the sample air is measured.

The sensing instrument 200 further includes the OPC 240 in fluid communication with the flow cell/common inlet 210 at opening 250. Sample gas flows through the common inlet 210 into the OPC 240 through opening 250, whereupon a number and a size of individual particles in the sample air is determined by correlating the intensity of a scattered light to a size of the individual particles in the sample air.

Figure 3:
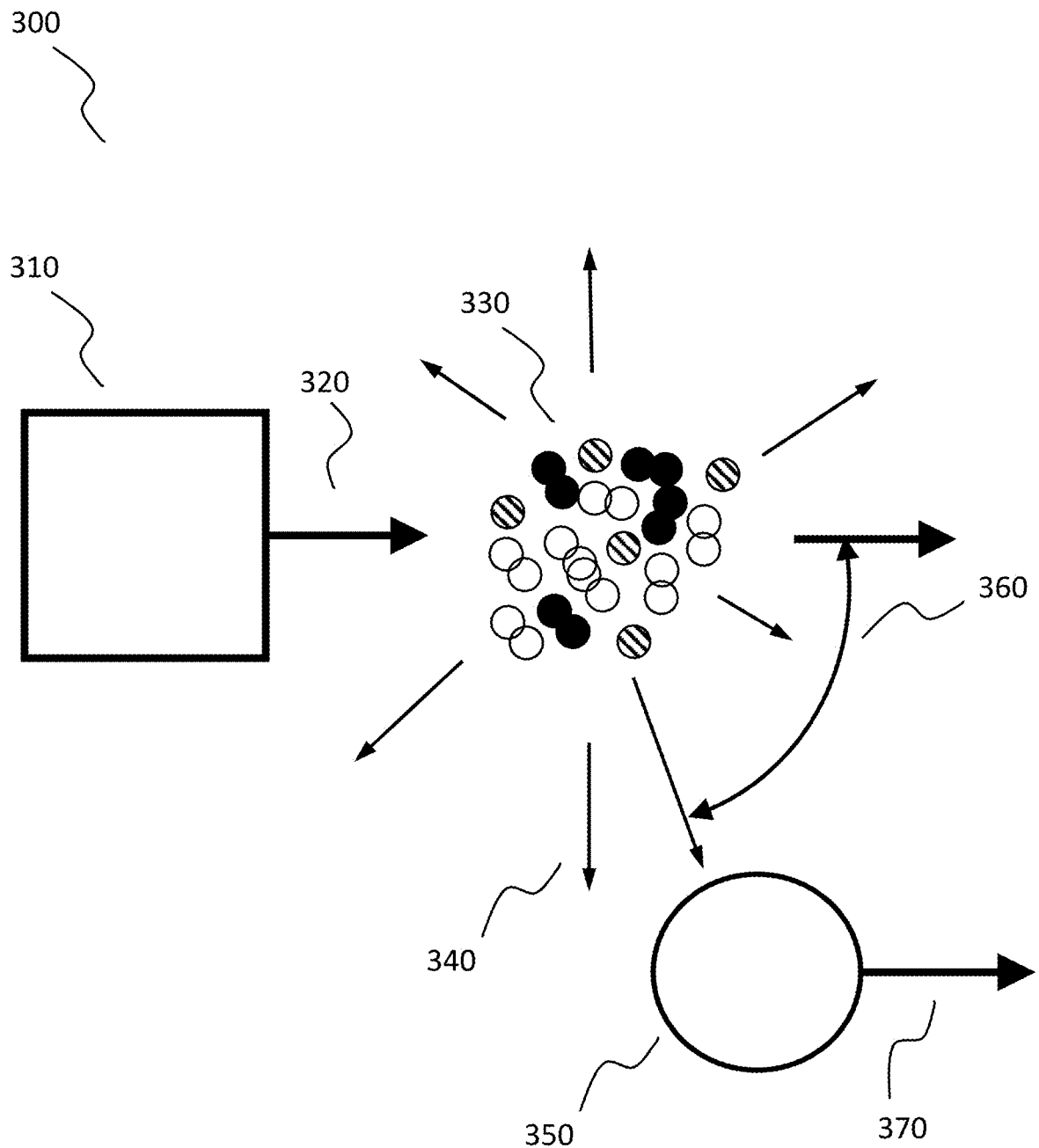
FIG. 3 schematically illustrates a non-limiting embodiment of a nephelometer.

FIG. 3 schematically illustrates a non-limiting embodiment of a nephelometer 300. The nephelometer 300 includes a nephelometer light source 310 that may include a laser or a light emitting diode (e.g., an LED). The light source 310 provides a columnated incident light 320 (e.g., light beam) that is directed toward an aerosol that includes a sample gas of atmospheric molecules and an ensemble of particle materials 330. The incident light 320 is scattered off of the aerosol ensemble. An optical detector 350 (e.g., light detector) is positioned at a scattering angle 360, and the optical detector 350 measures the total light scattered at the scattering angle 360. The total light measured by the light detector 350 is read out 370 to a memory.

Figure 4:
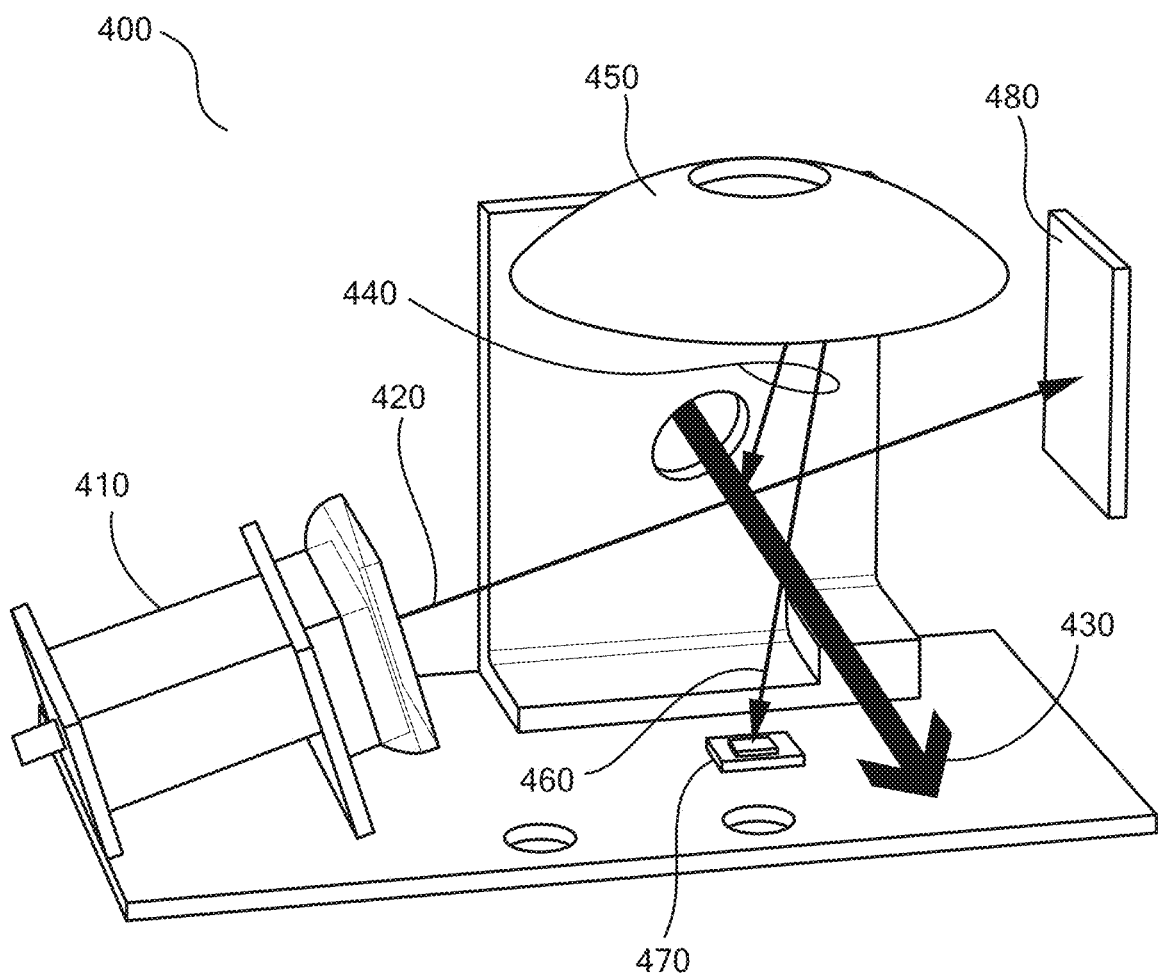
FIG. 4 illustrates a non-limiting embodiment of an optical particle counter.

FIG. 4 illustrates a non-limiting embodiment of an OPC 400. The OPC 400 includes an OPC light source 410 that may include a laser or a light emitting diode (e.g., an LED). The light source 410 provides a columnated incident light 420 (e.g., light beam) that is directed toward a stream of PMs 430. The OPC incident light 420 is scattered off of individual aerosols in the light beam 420, and the scattered light 440 is reflected off of elliptical refocusing mirror 450 and the reflected light 460 is detected at optical detector 470. The elliptical refocusing mirror 450 gathers the light scattered across many angles. The OPC optical detector 470 (e.g., OPC light detector 470) measures the scattered light 440 that is focused onto the optical detector 470 by the elliptical refocusing mirror 450, as well as light scattered directly into the optical detector 470. The total light measured by the OPC light detector 470 is stored in a memory.

Figure 5:
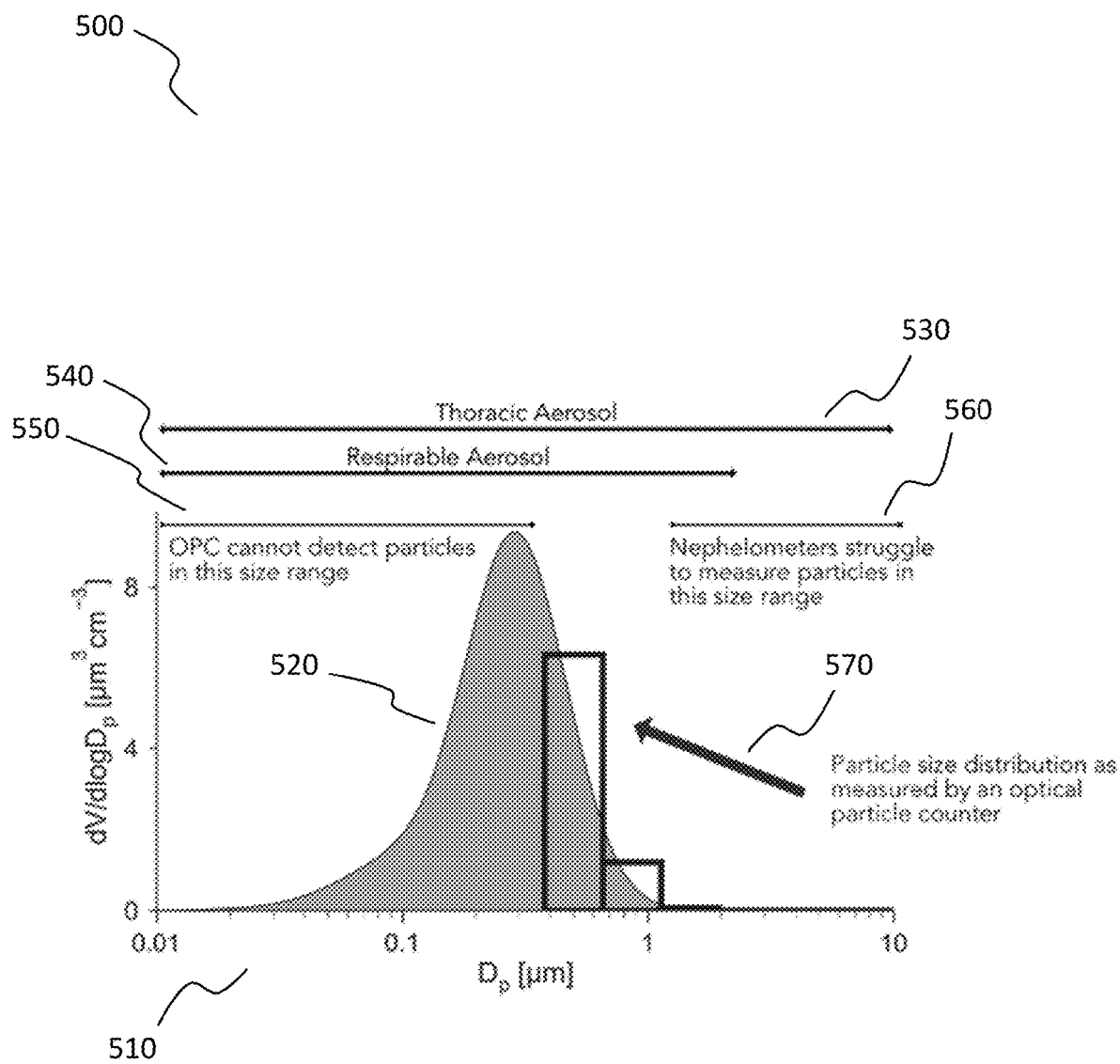
FIG. 5 shows a schematic representation of a plot of particle size distribution.

FIG. 5 shows a schematic representation of a plot of particle size distribution 500. The particle size distribution 520 is plotted on a log x-axis 510 of particle diameters. As indicated in FIG. 5, OPCs cannot detect particles 550 in size less than about 0.3 μm. Also indicated in FIG. 5, nephelometers may not measure particles 560 in the 1 μm to 10 μm size range. An overlay of particle size distribution 570 over the particle size distribution 520 as measured by an OPC is shown in FIG. 5. Also shown in the FIG. 5 is a size range for thoracic aerosols 530, which if inhaled penetrate a body beyond the larynx, and a size range for respirable aerosols 540, which if inhaled penetrate a body to the unciliated airways.

FIG. 5 graphically illustrates the necessity of combining a nephelometer with an OPC to determine a particle size distribution of an aerosol. If only the particles that could be measured with an OPC were counted, then there would be a significant undercount of the total number of particles in the sample air. For example, the total number of particles indicated in range 550 would be unmeasured if only an OPC were used. This mass of particles not detected or measured by an OPC may be referred to as a "missing mass." However, by combining the nephelometer with the OPC, the "missing mass" may be determined.

Figure 6:
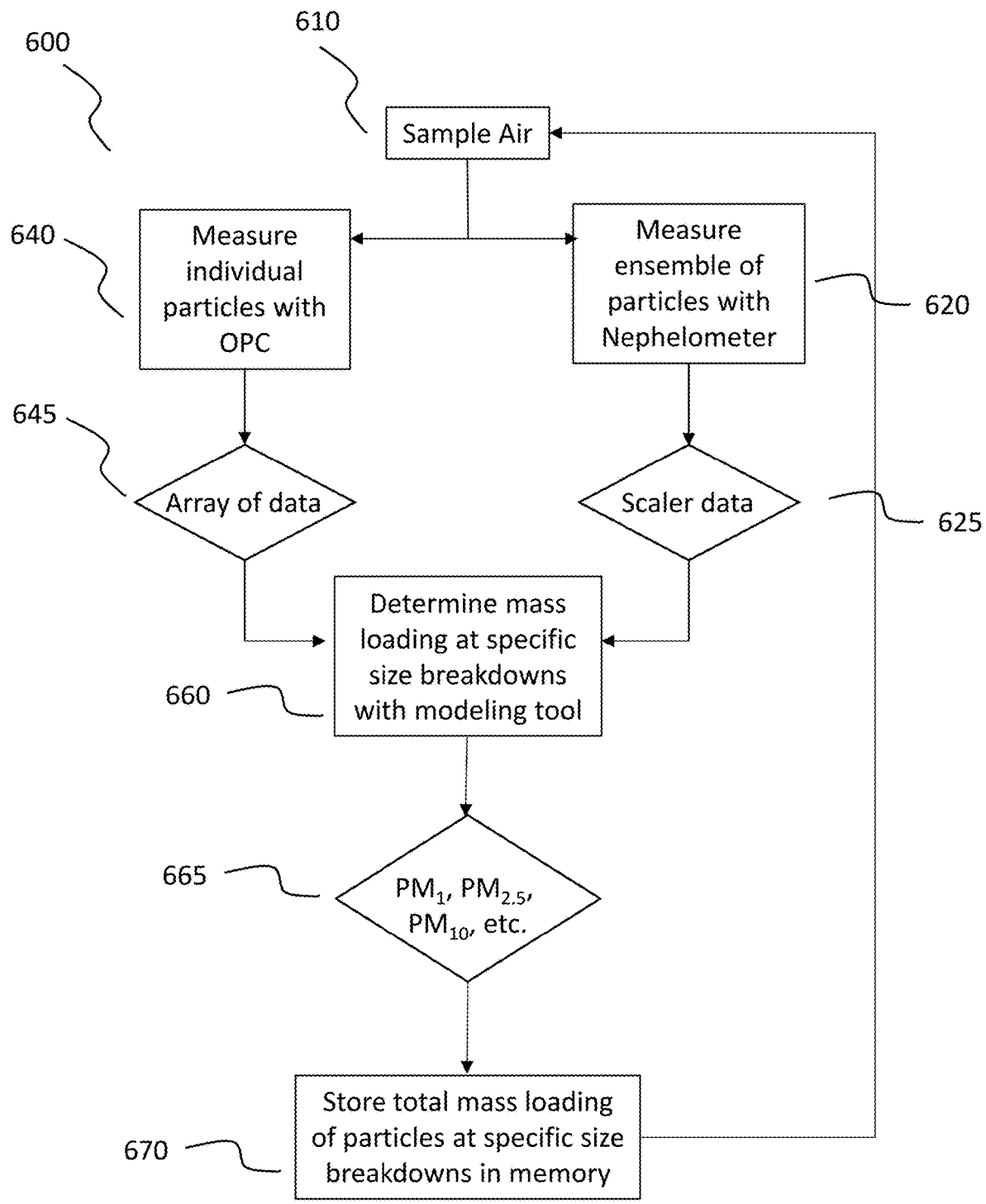
FIG. 6 illustrates a method of measuring particles in air.

FIG. 6 illustrates a method of measuring particles in air 600. Air is sampled through a common inlet 610. The air may be from an ambient source, such as might be sampled in a city street, an industrial location, a park, an apartment, and so on. The air may also be from a prepared source, such as a calibration sample. The common inlet is fluidly coupled to a first sensor and a second sensor.

The first sensor (e.g., nephelometer) measures 620 the sample air as an ensemble of particles. The first sensor is configured to use a light beam directed toward the ensemble of particles. The first sensor determines a total integrated scattered light signal given by the ensemble of particles in the first air sample. The total integrated scattered light signal is measured for a first duration across a range of angles from between about 5 degrees and about 175 degrees. The first sensor measures a scalar value of total light scattered, resulting in the first data set 625 (e.g., scaler data 625). In embodiments, the first sensor is a nephelometer 300.

The second sensor (e.g., OPC) measures 640 the sample air as individual particles. The second sensor determines a number of particles per cubic centimeter between a first particle diameter and a second particle diameter for a range of particle diameters. In some embodiments, the second sensor is an OPC 400. The second sensor output is an array of values 645 (e.g., array of data) consisting of the number of particles per cubic centimeter between two particle diameters for a range of diameters, comprising a second data set 645. For example, the first spectra will be of form:

$$X=[100, 80, 60, 50, 30, 10, 0, 0, 0]$$

where the first value is the number of particles per cubic centimeter between 0.3 μm and 0.5 μm, the second value is the number of particles between 0.5 μm and 1.0 μm, and so forth. Referring to FIG. 5 above, the overlay of data 570 indicate the data from an OPC overlaid onto the complete particle size distribution 520 consisting of all particles that exist in a population. Only the first three bins of the overlay 570 are easily visible as the number of particles in larger bins is so small. Note that the first bin begins around 380 nm, whereas the particle size distribution goes to near 0 nm. As discussed above, an OPC 400 cannot detect particles below this threshold (~300-400 nm in commercial instruments).

The mass loading at specific size breakdowns is determined 660 with a modeling tool 160. The modeling tool 160 runs on the processor 164 and memory 166. The modeling tool 160 uses processor 164 and memory 166 and runs a modeling algorithm. The modeling algorithm is configured to receive the first data set 625 configured to contain a single scalar value representing the total scattered light signal given by the ensemble of particles in the first air, and to receive the second data 645 set configured to contain an array comprising the number of particles per cubic centimeter between a first particle diameter and a second particle diameter for a range of particle diameters.

Following collection of the light scattering data from the first and second sensors (e.g., the nephelometer and the OPC, respectively) the algorithm corrects the OPC data for hygroscopic growth as a function of particle size. Light scattering data is impacted by how aerosol optical and physical properties change in response to their environment, especially as it relates to hygroscopic growth due to water uptake which changes the size of the particle, the shape of the particle, and the refractive index of the particle. Since the objective is to compute integrated mass values on a dry-basis, the raw OPC data is corrected for hygroscopic growth using K-Kohler theory. Practically speaking, this means that the effective size is adjusted for each size bin by converting between a wet-particle basis and dry-particle basis assuming a kappa value that is a function of particle size.

Figure 7:
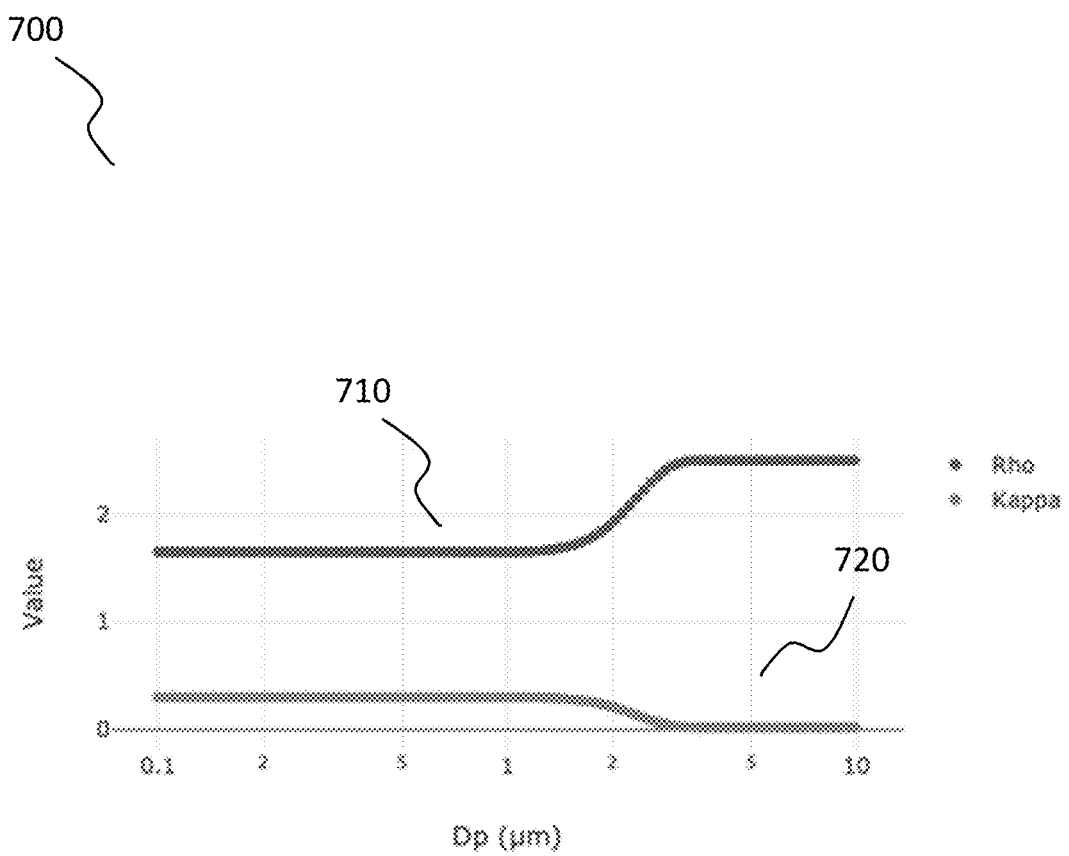
FIG. 7 shows an "S-curve"

FIG. 7 shows an "S-curve" 700 that is used to compute the kappa value as a function of size using reasonable estimates for kappa from the literature assuming particles are "urban/anthropogenic" at smaller sizes (more hygroscopic), and dust/sand at larger sizes (less hygroscopic). The S-curve 700 of FIG. 7 presents density (Rho) and Kappa as a function of particle size used in the modeling algorithm.

Once the OPC data has been corrected for hygroscopic growth, the modeling algorithm integrates the OPC data to get the integrated mass between the lower and desired limits of particle sizes. A stepwise integration is used to convert from number of particles per size bin to the total mass of particles in that size bin, and then the total mass of the particles in each bin are summed to calculate the total integrated mass between some lower and upper size limit (e.g., in each size bin). This involves several steps: first, the number of particles are converted to a volume of particles by assuming each particle is a perfect sphere (and thus using the equation for volume of a sphere). Then the size-dependent density is multiplied that assumes the particles are "urban/anthropogenic" (less dense) at smaller sizes and dust/sand (more dense) at larger sizes. Once this step is complete, a good measurement of the total mass of particles between the lower limit and upper limit of the OPC has been determined. That is, this completes the calculation of particle mass as determined by the OPC. However, since the OPC cannot detect particles smaller than about 0.3 μm, it is necessary to next determine the "missing mass" using the nephelometer data (e.g., the particle sizes indicated in region 550 of FIG. 5).

Next, the nephelometer data is used to estimate the "missing mass" below the lower limit of the OPC. The above estimate for the PM value is not completely reflective of the aerosol as a whole, because the "missing mass" must be included. This is done by including the total scattered light signal from the nephelometer in the calculation. The scattering intensity ($C_{scat}$) value from the nephelometer is used to estimate what is missing using a simple difference method between the two measurements.

Furthermore, in some embodiments, ML/AI (as discussed above) may be used to reduce the uncertainty with the PM size estimations by leveraging the extensive datasets that have been collected showing the relationship between the $C_{scat}$ and OPC data as a function of aerosol type.

Returning to FIG. 6, the modeling tool 160 determines the total mass loading at specific size breakdowns 665. These data will include at least $PM_1$, $PM_{2.5}$, and $PM_{10}$.

The determined PM data is stored 670 in memory. That is, the total mass loading at specific size breakdowns 665 is stored in memory. The memory may be a memory device, a storage device, and so on.

Figure 8:
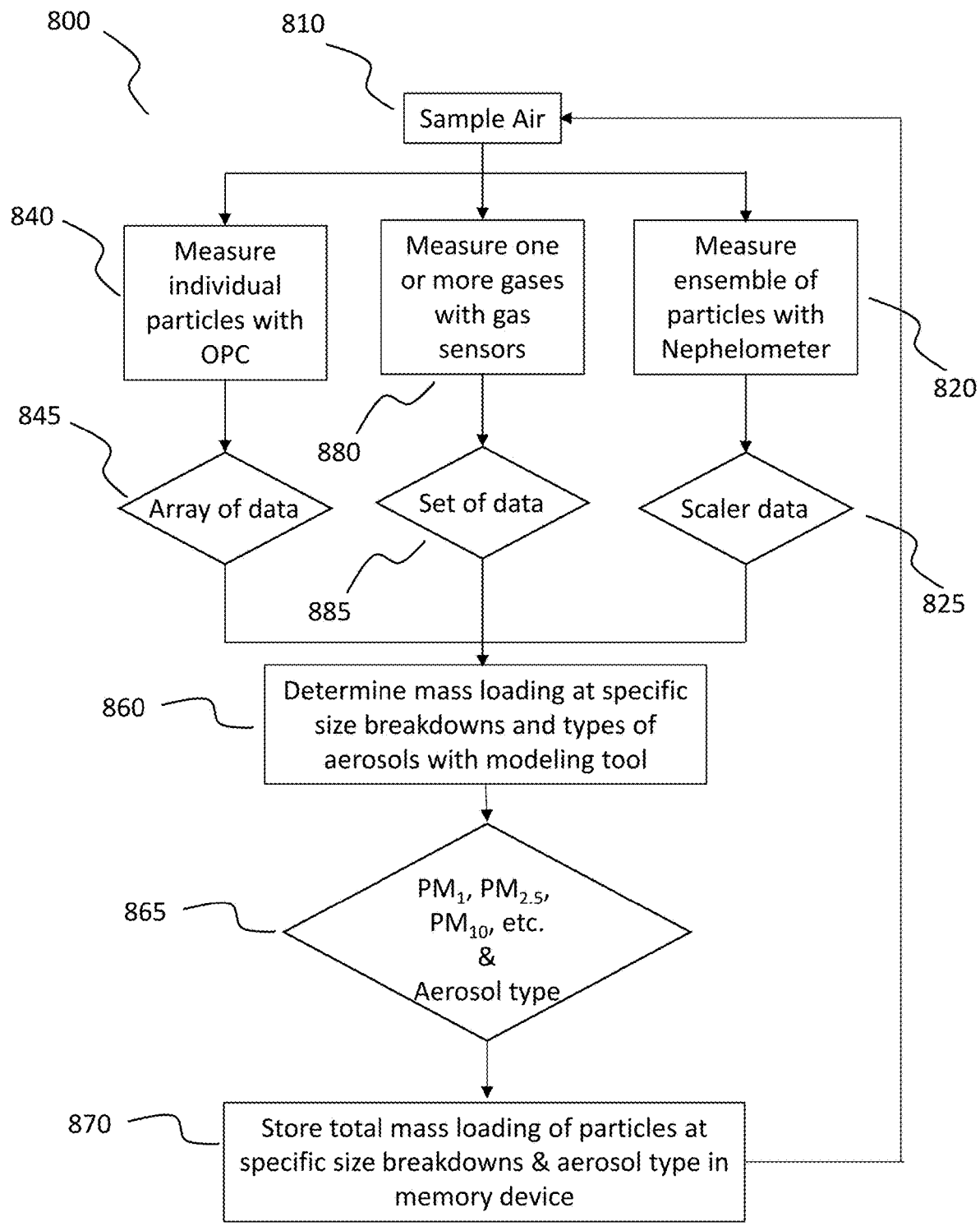
FIG. 8 illustrates a method of measuring particles in air.

FIG. 8 illustrates another method of measuring particles in air 800. Air is sampled 810 through a common inlet 110. The air may be from an ambient source, such as might be sampled in a city street, an industrial location, a park, an apartment, and so on. The air may also be from a prepared source, such as a calibration sample. The common inlet is fluidly coupled to a first sensor, a second sensor, and one or more gas sensors.

The first sensor measures 820 the sample air as an ensemble of particles. The first sensor is (e.g., nephelometer) is configured to use a light beam directed toward the ensemble of particles. The first sensor determines a total integrated scattered light signal given by the ensemble of particles in the first air sample. The total integrated scattered light signal is measured for a first duration across a range of angles from between about 5 degrees and about 175 degrees. The first sensor measures a scalar value of total light scattered, resulting in the first data set 825 (e.g. scaler data 825). In embodiments, the first sensor comprises a nephelometer 300.

The second sensor measures 840 the sample air as individual particles. In some embodiments, the second sensor is an OPC 400. The second sensor determines a number of particles per cubic centimeter between a first particle diameter and a second particle diameter for a range of particle diameters. The second sensor output is an array of values (e.g., array of data) 845 consisting of the number of particles per cubic centimeter between two particle diameters for a range of diameters, comprising a second data set 845. For example, the first spectra will be of form:

$$X=[100, 80, 60, 50, 30, 10, 0, 0, 0]$$

where the first value is the number of particles per cubic centimeter between 0.3 μm and 0.5 μm, the second value is the number of particles between 0.5 μm and 1.0 μm, and so forth.

The one or more gas sensors 170 detect and measure 880 one or more gases in the sample air. The one or more gas sensors 170 may detect and measure at least one or more of $O_3$, NO, $H_2S$, $SO_2$, $NO_2$, $CO_2$, or CO. The one or more gas sensors generate a set of data 885 configured to identify and measure the concentration of at least one or more of $O_3$, NO, $H_2S$, $SO_2$, $NO_2$, $CO_2$, or CO.

The mass loading at specific size breakdowns and the types of aerosols are determined 860 with a modeling tool 160. The modeling tool 160 is coupled to processor 164 and memory 166. The modeling tool 160 uses processor 164 and memory 166 and runs a modeling algorithm. The modeling algorithm is configured to receive the first data set 825 configured to contain a single scalar value representing the total scattered light signal given by the ensemble of particles in the first air, to receive the second data 845 set configured to contain an array comprising the number of particles per cubic centimeter between a first particle diameter and a second particle diameter for a range of particle diameters, and a data set 885 configured to contain an identity and concentration of one or more gases.

Following collection of the light scattering data from the first and second sensors (e.g., the nephelometer and the OPC, respectively) the algorithm corrects the OPC data for hygroscopic growth as a function of particle size. Light scattering data is impacted by how aerosol optical and physical properties change in response to their environment, especially as it relates to hygroscopic growth due to water uptake which changes the size of the particle, the shape of the particle, and the refractive index of the particle. Since the objective is to compute integrated mass values on a dry-basis, the raw OPC data is corrected for hygroscopic growth using K-Kohler theory. Practically speaking, this means that the effective size is adjusted for each size bin by converting between a wet-particle basis and dry-particle basis assuming a kappa value that is a function of particle size.

Once the OPC data has been corrected for hygroscopic growth, the modeling algorithm integrates the OPC data to get the integrated mass between the lower and desired limits of particles sizes. A stepwise integration is used to convert from number of particles per size bin to the total mass of particles in that size bin, and then the total mass of the particles in each bin are summed to calculate the total integrated mass between some lower and upper size limit (e.g., in each size bin). This involves several steps: first, the number of particles are converted to a volume of particles by assuming each particle is a perfect sphere (and thus using the equation for volume of a sphere). Then, the size-dependent density is multiplied incorporating the assumption that the particles are "urban/anthropogenic" (less dense) at smaller sizes and dust/sand (more dense) at larger sizes. Once this step is complete, a good measurement of the total mass of particles between the lower limit and upper limit of the OPC has been determined. That is, this completes the calculation of particle mass as determined by the OPC. However, since the OPC cannot detect particles smaller than about 0.3 µm, it is necessary to next determine the "missing mass" using the nephelometer data (e.g., the particle sizes indicated in region 550 as discussed in relation to FIG. 5 above).

Next, is to use the nephelometer data to estimate the "missing mass" below the lower limit of the OPC. The above estimate for the PM value is not reflective of the aerosol as a whole, because the "missing mass" must be included. This is done by including the total scattered light signal from the nephelometer in the calculation. The $C_{scat}$ value from the nephelometer is used to estimate what is missing using a simple difference method between the two measurements.

Next, the modeling tool identifies the type of aerosol that characterizes the sample air using the modeling algorithm. The modeling algorithm uses the identities and concentrations of at least one or more of $O_3$, NO, $H_2S$, $SO_2$, $NO_2$, $CO_2$, or CO for modeling the aerosol.

EXAMPLES

The following examples are intended to further illustrate the disclosure and its preferred embodiments.

Example 1

Figure 9:
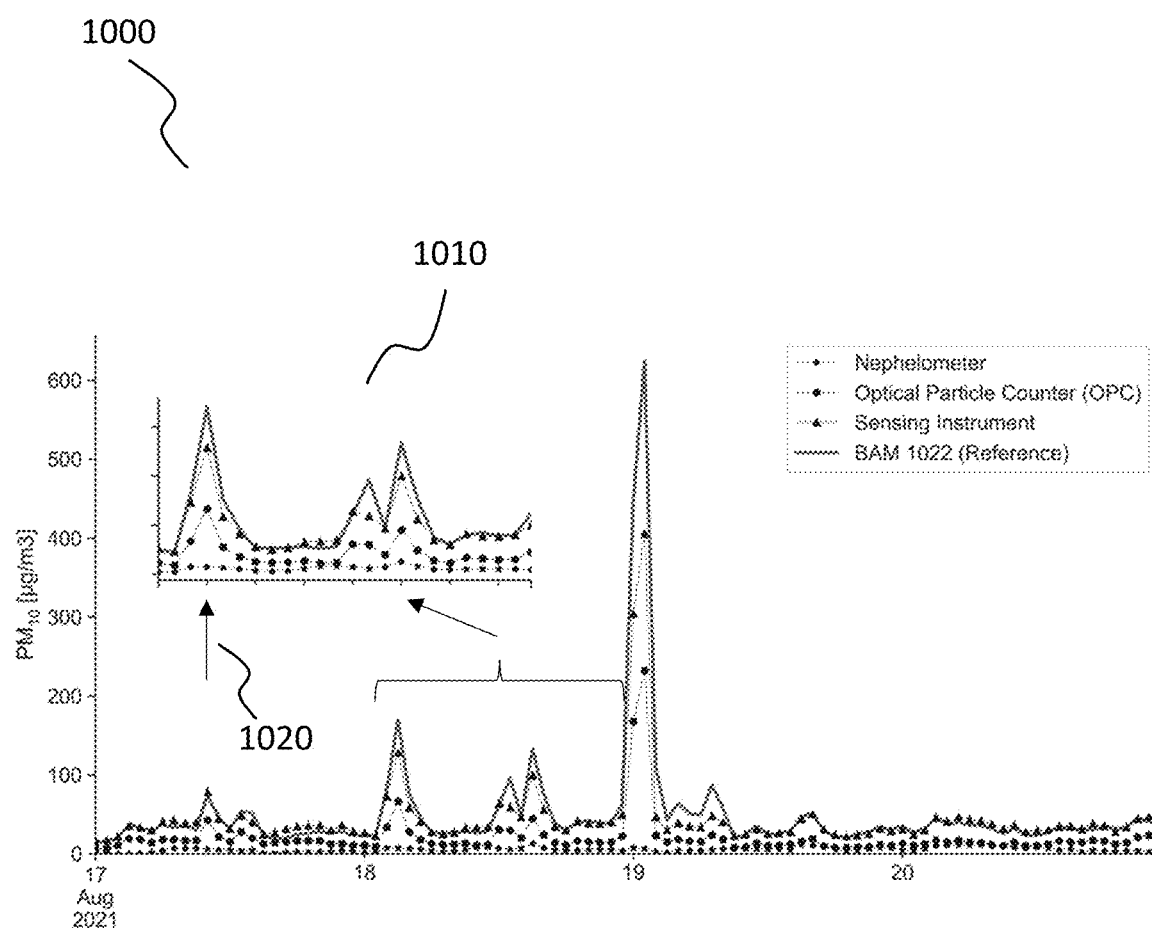
FIG. 9 shows a time series of measurements of $PM_{10}$ particles.

As an example of an embodiment of the sensing instrument determining a mass loading of particles in a real-life setting, FIG. 9 shows a time series of measurements of $PM_{10}$ particles collected in an outdoor ambient near-desert setting impacted by elevated concentrations of resuspended, wind-blow dust ($PM_{10}$) over a four-day period from 17 Aug. 2021 to 21 Aug. 2021. Four data traces are shown. The nephelometer, the OPC, and the sensing instrument data traces were recorded simultaneously with an embodiment of the sensing instrument of the current disclosure. The BAM 1022 (Reference) data trace is taken from a state-of-the-art reference instrument operating concurrently with the sensing instrument.

The nephelometer trace (small solid circles) and the OPC trace (large solid circles) are raw data measurements taken by the respective sensors in the sensing instrument. As can be seen, the nephelometer trace is nearly flat when measuring $PM_{10}$ particles. The small signal from the nephelometer is particularly noticeable in the blow up of region 1010. Referring to region 1020, it can be seen that while the OPC trace shows a peak, the nephelometer trace is essentially flat. This is to be expected, because the nephelometer is not sensitive to particles larger than about 1 µm in diameter. In contrast, the OPC trace shows peaks consistent with the detection of $PM_{10}$ particles, with peaks associated with the early hours of the $18^{th}$ and $19^{th}$ of Aug. 2021.

The sensing instrument trace (solid triangles) combines the data from the nephelometer with the data from the OPC in the modeling tool to determine the total mass loading of the sample air over the time duration of the experiment. The data trace from the sensing instrument is close to the EPA FEM reference instrument (BAM 1022).

Figure 10:
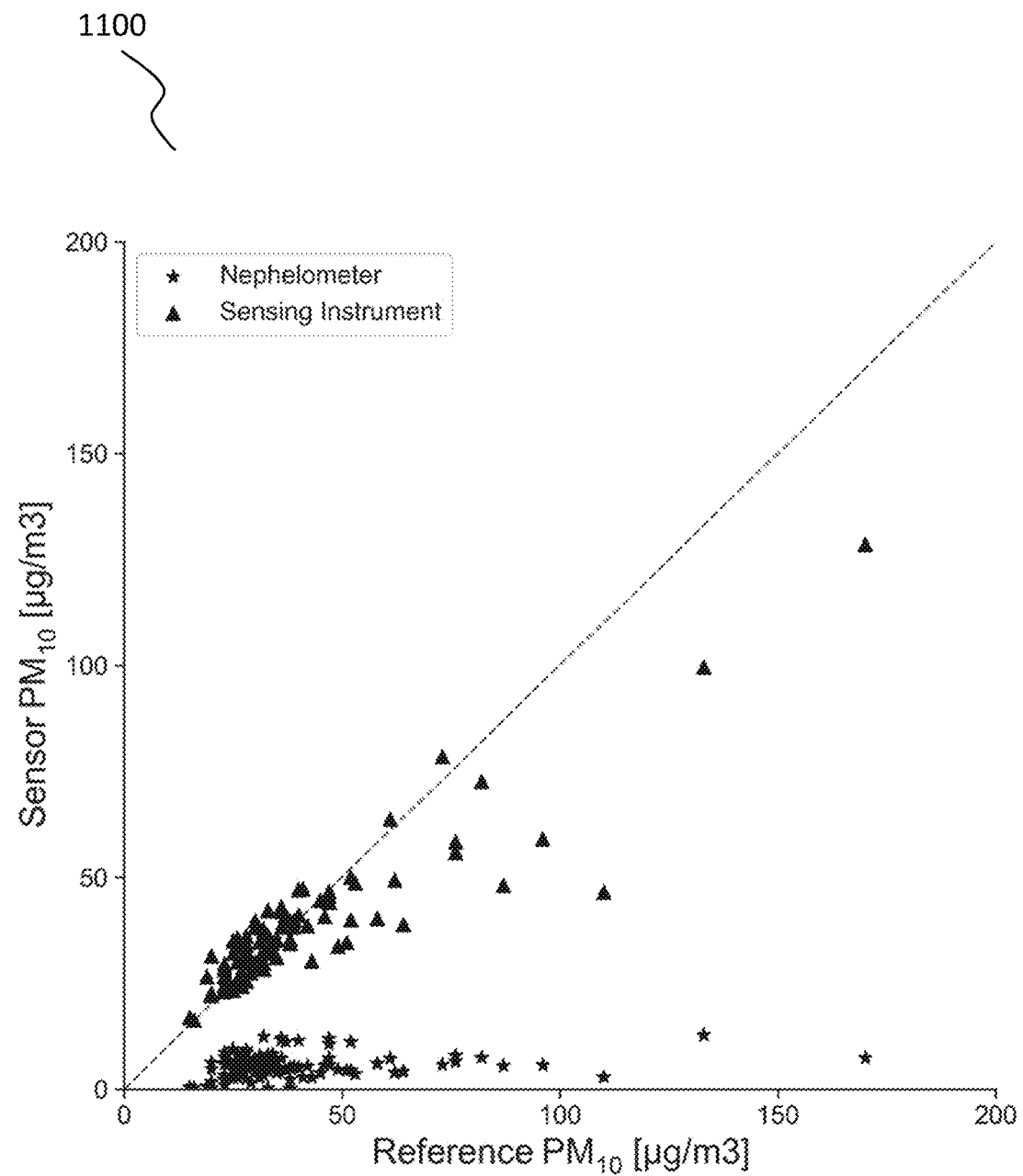
FIG. 10 shows a scatter plot of calculated sensing instrument $PM_{10}$ particle data and measured nephelometer sensor $PM_{10}$ particle data.

FIG. 10 shows a scatter plot of the calculated sensing instrument $PM_{10}$ particle data and the measured nephelometer sensor $PM_{10}$ particle data plotted versus the reference $PM_{10}$ particle data plotted in the time series data in FIG. 10. The sensing instrument $PM_{10}$ particle data nearly fits a one-to-one correlation with the reference $PM_{10}$ particle data.

These surprising results indicate that the sensing instrument using inexpensive OPSs combined with the modeling algorithm can estimate particle $PM_{10}$ mass loadings close to those measured by state-of-the-art reference instruments.

Example 2

Figure 11:
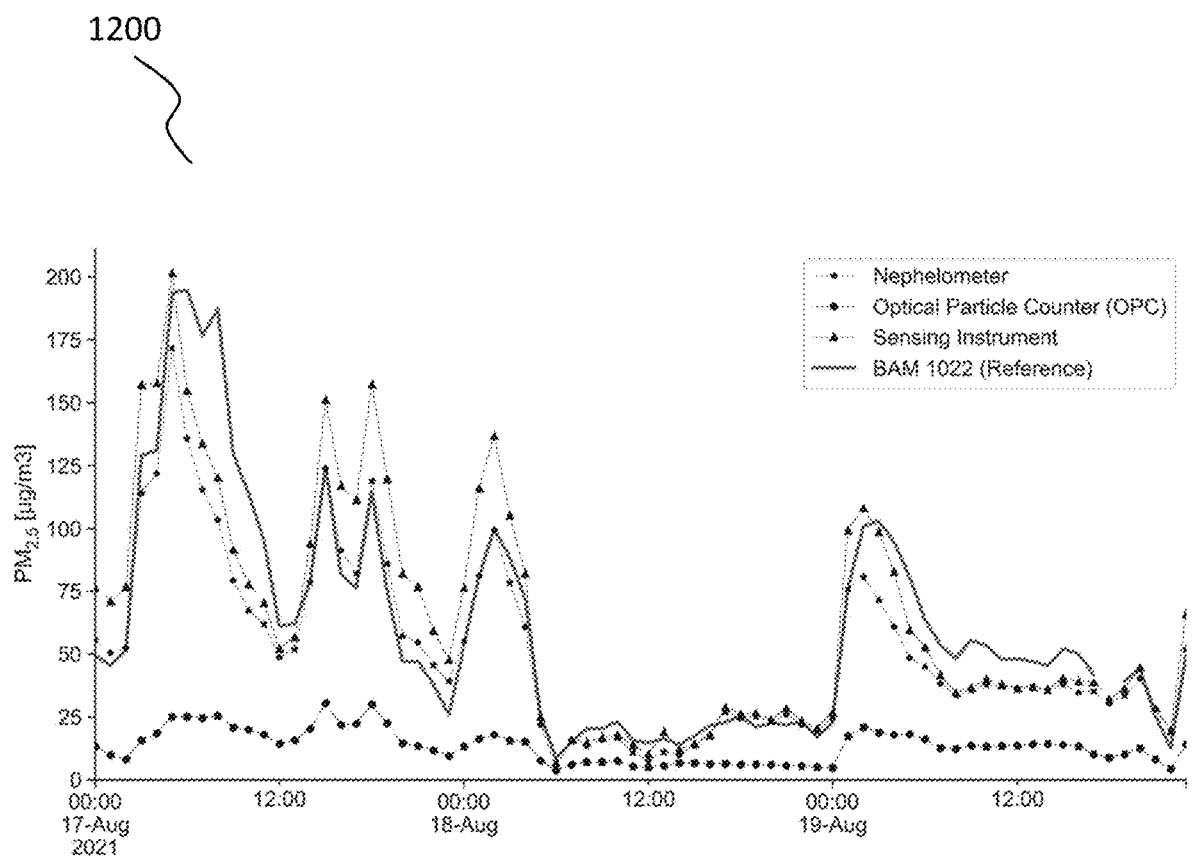
FIG. 11 shows a time series of measurements of $PM_{2.5}$ particles.

As another example of an embodiment of the sensing instrument determining a mass loading of particles in a real-life setting, FIG. 11 shows a time series of measurements of $PM_{2.5}$ particles in an ambient outdoor environment impacted by wildfire smoke over a three-day period from 17 Aug. 2021 to 20 Aug. 2021. Again, four data traces are shown. The nephelometer, the OPC, and the sensing instrument data traces were recorded simultaneously with the embodiment of the sensing instrument of the current disclosure, as discussed above in Example 1. The BAM 1022 (Reference) data trace is taken from the same state-of-the-art reference instrument operating concurrently with the sensing instrument.

Similar to Example 1, the nephelometer trace (small solid circles) and the OPC trace (large solid circles) are raw data measurements taken by the respective sensors in the sensing instrument. As can be seen, the OPC trace is less sensitive when measuring $PM_{2.5}$ wildfire smoke particles. The small signal from the OPC is particularly noticeable during 17 August and early 18 August. Referring to this day and one half region in time series 1200, it can be seen that while the nephelometer trace shows several peaks, the OPC trace is essentially flat. This is to be expected, because the OPC is not sensitive to particles smaller than about 0.4 m. In contrast, the nephelometer trace shows peaks consistent with the detection of $PM_{2.5}$ particles, with peaks associated with the early hours of the 18th and $19^{th}$ of Aug. 2021.

The sensing instrument trace (solid triangles) combines the data from the nephelometer with the data from the OPC in the modeling tool to determine the total mass loading of the sample air over the time duration of the experiment. The data trace from the sensing instrument is close to the reference instrument (BAM 1022).

Figure 12:
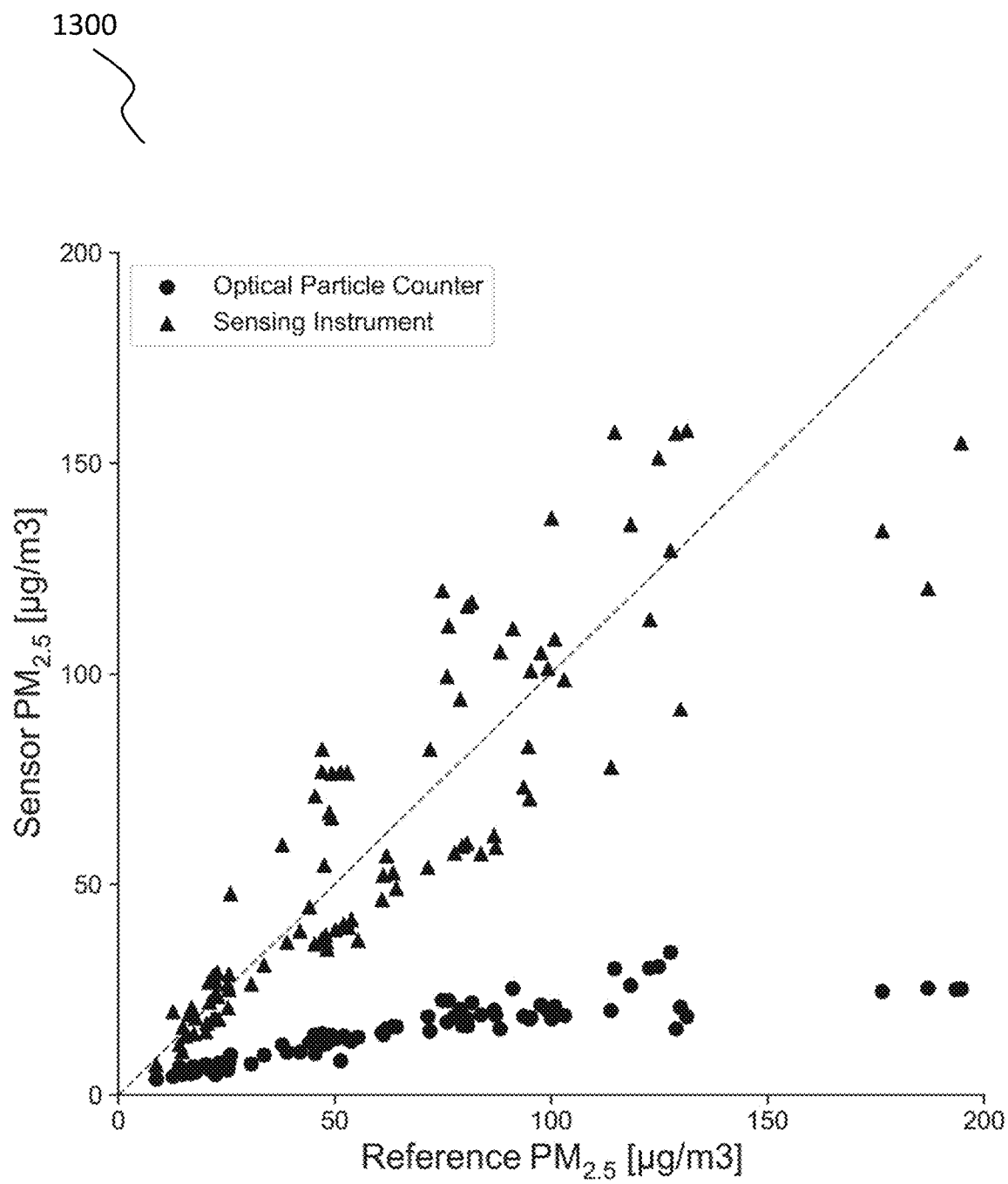
FIG. 12 shows a scatter plot of the calculated sensing instrument $PM_{2.5}$ particle data and the measured nephelometer sensor $PM_{2.5}$ particle data.

FIG. 12 shows a scatter plot 1300 of the calculated sensing instrument $PM_{2.5}$ particle data and the measured nephelometer sensor $PM_{2.5}$ particle data plotted versus the reference $PM_{2.5}$ particle data plotted in the time series data in FIG. 12. The sensing instrument $PM_{2.5}$ particle data nearly fits a one-to-one correlation with the reference $PM_{2.5}$ particle data.

These surprising results indicate that the sensing instrument using inexpensive OPSs combined with the modeling algorithm can estimate particle mass loadings close to those measured by state-of-the-art reference instruments.

Various embodiments of the invention may be implemented at least in part in any conventional computer programming language. For example, some embodiments may be implemented in a procedural programming language (e.g., "C"), as a visual programming process, or in an object-oriented programming language (e.g., "C++"). Other embodiments of the invention may be implemented as a pre-configured, stand-along hardware element and/or as preprogrammed hardware elements (e.g., application specific integrated circuits, FPGAs, and digital signal processors), or other related components.

In an alternative embodiment, the disclosed apparatus and methods (e.g., see the methods described above) may be implemented as a computer program product for use with a computer system. Such implementation may include a series of computer instructions fixed either on a tangible, non-transitory, non-transient medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

The embodiments of the invention described above are intended to be merely exemplary; numerous variations and modifications will be apparent to those skilled in the art. Such variations and modifications are intended to be within the scope of the present invention as defined by any of the appended claims.

Although the above discussion discloses various exemplary embodiments of the invention, it should be apparent that those skilled in the art can make various modifications that will achieve some of the advantages of the invention without departing from the true scope of the invention.

What is claimed is:

1. A device for measuring particles in air, the device comprising:
   a first sensor, comprising a first optical detector, configured to measure the particles in the air as an ensemble using a light beam directed toward the ensemble of particles, the first sensor determining a first data set comprising a total integrated scattered light signal given by the ensemble of particles in the air, the total integrated scattered light signal detected by the first optical detector positioned at a scattering angle, the scattering angle being between about 5 degrees and about 175 degrees;
   a second sensor, comprising a second optical detector, configured to produce a light path through which individual particles in the air pass, the second sensor configured to determine a second data set comprising a number and a particle size of the individual particles by correlating an intensity of light scattered by the individual particles to the size of the individual particles, the particle size of the individual particle being proportional to the intensity of the scattered light detected by the second optical detector; and
   a processor configured to execute a modeling tool, the processor being operatively coupled with the first and second sensors, the modeling tool configured to determine a total mass loading of particles in the air at specific size breakdowns, wherein the determination is based on the total integrated scattered light signal and the number and size of individual particles;
   a memory device operatively coupled with the modeling tool, the total mass loading of particles in the air at specific size breakdowns is-stored in the memory device.

2. The device of claim 1, further comprising:
   a common inlet fluidly coupled with the first sensor and the second sensor.

3. The device of claim 2, wherein the first and second sensors are configured to substantially simultaneously measure particles in the air.

4. The device of claim 1, wherein the first sensor comprises a nephelometer.

5. The device of claim 1, wherein the second sensor comprises an optical particle counter.

6. The device of claim 1 further comprising:
   one or more of a humidity sensor, a temperature sensor, or a pressure sensor.

7. The device of claim 1, wherein the first sensor is configured to collect the total integrated scattered light signal for an interval of between 0.01 seconds and 60 seconds.

8. The device of claim 1, wherein the second sensor is configured to collect the intensity of light scattered by the individual particles at a sampling rate between 500 kHz and 50 MHz, for duration of between 0.1 seconds and 120 seconds.

9. The device of claim 8, wherein the sampling rate is 1 MHZ, and the duration is 5 seconds.

10. A method of measuring particles in air, the method comprising:
    sampling an air with a common inlet fluidly coupled to a first sensor and a second sensor, a first air sample fluidly passing to the first sensor, and a second air sample fluidly passing to the second sensor;

measuring first particles in the first air sample with the first sensor as an ensemble of particles, the first sensor, comprising a first optical detector and configured to use a light beam directed toward the ensemble of particles, the first sensor determining a first data set comprising a total integrated scattered light signal given by the ensemble of particles in the first air sample, the total integrated scattered light signal measured at a scattering angle for a first duration;

measuring second particles in the second air sample as individual particles in the second air sample with the second sensor, comprising a second optical detector, for a second duration, the second sensor configured to:
  produce a light path through which the individual particles in the second air sample pass; and
  measure a scattered light signal from individual particles passing through the light path to determine a number of particles per cubic centimeter between a first particle diameter and a second particle diameter for a range of particle diameters;

determining a total mass loading at specific size breakdowns of particles in the air, said determining a total mass comprising receiving:
  a first data set configured to contain a single scalar value representing the total scattered light signal given by the ensemble of particles in the first air; and
  a second data set configured to contain an array comprising the number of particles per cubic centimeter between a first particle diameter and a second particle diameter for a range of particle diameters; and storing, in a memory, the total mass loading at specific size breakdowns of particles in the air.

11. The method of claim 10, wherein the second sensor comprises an optical particle counter.

12. The method of claim 10, wherein:
the scattered light signal by each individual particle is measured as a light pulse;
the signal from each light pulse is assigned to a size bin based on an intensity of the signal; and
the second sensor sorts each size bin into a histogram.

13. The method of claim 10, wherein:
the sampling rate of the second sensor is between 500 kHz and 10 MHz;
the first duration is between 1 second and 1 minute; and
the second duration is between 1 second and 1 minute.

14. The method of claim 12, wherein said determining a total mass comprises determining the total mass loading at specific size breakdowns of the particles in the air after the first duration and second duration are complete.

15. The method of claim 10, further comprising:
measuring one of one or more of a humidity, a temperature, or a pressure of the sample air with at least one of a humidity sensor, a temperature sensor, or a pressure sensor.

16. The method of claim 10, further comprising:
measuring at least one of $O_3$, NO, $H_2S$, $SO_2$, $NO_2$, $CO_2$, or CO with one or more gas sensors.

17. A system for measuring particles in air, the system comprising: a processor;
a memory coupled to the processor;
a first sensor, comprising a first optical detector, configured to measure the particles in a first air as an ensemble using a light beam directed toward the ensemble of particles, the light beam scattering off of the ensemble of particles in the first air, the first sensor determining a first data set comprising a total integrated scattered light signal;

a second sensor, comprising a second optical detector, configured to measure individual particles in a second air, the second sensor configured to determine a second data set comprising a number and a particle size of the individual particles in the second air by correlating an intensity of the light scattered by the individual particles to the particle size of the individual particles in the second air;

a common inlet fluidly coupled with the first sensor and the second sensor; and a processor configured to execute a modeling tool, the processor operably coupled with the processor;
wherein the modeling tool is configured to:
  receive:
    the first data set configured to contain a single scalar value representing the total scattered light signal given by the ensemble of particles in the first air; and
    the second data set configured to contain an array comprising a number of particles per cubic centimeter between a first particle diameter and a second particle diameter for a range of particle diameters;
  determine a total mass loading at specific size breakdowns of particles in the air; and
  store the determined total mass loading at specific size breakdowns of particles in the air.

18. The system of claim 17, wherein:
the first sensor comprises a nephelometer; and
the nephelometer is configured to measure the total scattered light signal by the ensemble of particles in the first air across a scattering angle.

19. The system of claim 17, further comprising:
one or more of a humidity sensor, a temperature sensor, and a pressure sensor.

20. The system of claim 17, wherein the first air and the second air comprise an air sample collected by the common inlet at substantially a same time from substantially a same location.

21. The system of claim 17 further comprising:
one or more gas sensors fluidly coupled with the common inlet.

22. The system of claim 21, wherein the one or more gas sensors measure at least one of $O_3$, NO, $H_2S$, $SO_2$, $NO_2$, $CO_2$, or CO.

23. The device of claim 1, wherein the processor configured with the modeling tool is configured to:
receive the first data set configured to contain a single scalar value representing the total scattered light signal given by the ensemble of particles in the first air;
receive the second data set configured to contain an array comprising the number of particles per cubic centimeter between a first particle diameter and a second particle diameter for a range of particle diameters;
correct the particle size of the individual particles in the second data set for hygroscopic growth as a function of particle size;
integrate the corrected second data set to get a total integrated mass between the lower size limit and the upper size limit in each given size bin of corrected particle sizes; and
estimate a missing mass of particles with sizes below about 0.3 microns.

24. The device of claim 23, wherein integrate the corrected second data set comprises:
- stepwise integrate a number of particles per size in a given size bin to convert the number of particles per size in the given size bin to a total mass of particles in the given size bin; and
- sum the total mass of the particles in each given size bin to calculate a total integrated mass between the lower size limit and the upper size limit in each given size bin of corrected particle sizes.

25. The device of claim 23, wherein estimate a missing mass of particles comprises:
- determine a total light signal from the total integrated mass of particles; and
- subtract the total light signal from the total integrated mass of particles from the total scattered light signal given by the ensemble of particles, wherein the difference between total light signal from the total integrated mass of particles and the total scattered light signal given by the ensemble of particles provides an estimate a missing mass of particles.

* * * * *